Jan. 5, 1960    A. L. EVERITT    2,919,737
WHEEL CUSHIONING STRUCTURE
Filed Dec. 23, 1957    2 Sheets-Sheet 1

INVENTOR.
Allen L. Everitt
BY
John T. Marvin
His Attorney

United States Patent Office

2,919,737
WHEEL CUSHIONING STRUCTURE

Allen L. Everitt, Dayton, Ohio, assignor to General Motors Corporation, Detroit, Mich., a corporation of Delaware Application December 23, 1957, Serial No. 704,754

4 Claims. (Cl. 152—47)

This invention relates to vehicle wheels, and, particularly, to a cushioned wheel utilizing a plurality of preassembled, preloaded bushings to absorb torsional vibrations as well as radial and axial loads transmitted to the wheel.

An object of this invention is to provide a new and improved wheel cushioning structure utilizing a plurality of preloaded shear bushings pressed between equal area surfaces in pairs concentric relative to each other and of substantially equal areas relative to each other for torsional and axial stressing of each preloaded elastomeric bushing between each pair of surfaces.

Another object of this invention is to provide a wheel cushioning structure including an outer annular rim portion having an axially extending annular flange portion and an inner annular rim portion having an annular flange portion extending axially and concentrically relative to the outer flange portion with a surface substantially equal in area to a surface of the inner flange portion, a preloaded torsional elastomeric bushing pressed between the inner and outer flange portions, and a pair of axial-control elastomeric beads or rings of annular shape each preloaded between substanially equal area radial and annular surface portions carried by the inner and outer rim portions to limit axial or lateral movement of the inner and outer rim portions relative to each other while the preloaded bushing aids both in opposing axial or lateral movement and in opposing torsional deflection of the inner and outer rim portions relative to each other.

Another object of this invention is to provide a road wheel construction wherein a wheel disc connecting a tire mounting rim and a hub is divided into two annular portions having axial complementary flange portions including an outer disc portion supported relative to an inner disc portion only by means of a preloaded elastomeric axial bushing means engaging the axial complementary disc flange portions and including preloaded elastomeric bushings for limiting relative axial movement of the disc portions all cooperating to provide a torsional cushion eliminating any sliding engagement of the inner or outer disc portions relative to each other or relative to any other wheel part for reducing strain and resulting wear on component parts of the wheel and for shock loading induced by acceleration or deceleration of a vehicle thereby reducing torsional vibration noises often caused by brake application, final or rear axle drive, and other sources such as tire noise and road surface irregularities.

Another object of this invention is to provide a wheel cushioning structure wherein a wheel disc connecting a tire mounting rim and a hub is divided into two annular portions having axial complementary flange portions spaced from each other and supported relative to each other only by a preloaded elastomeric bushing for opposing torsional and axial deflections of the rim relative to the hub and wherein each of the annular wheel disc portions carries radial flange portions which are spaced longitudinally relative to each other at each of opposite ends of the axial flange portions and which are laterally supported relative to each other only by preloaded elastomeric bushings extending radially outwardly relative to the hub for torsional and lateral or axial shock loading of the rim relative to the hub through the divided disc.

Further objects and advantages of the present invention will be apparent from the following description, reference being had to the accompanying drawings wherein a preferred embodiment of the present invention is clearly shown.

Figure 1:
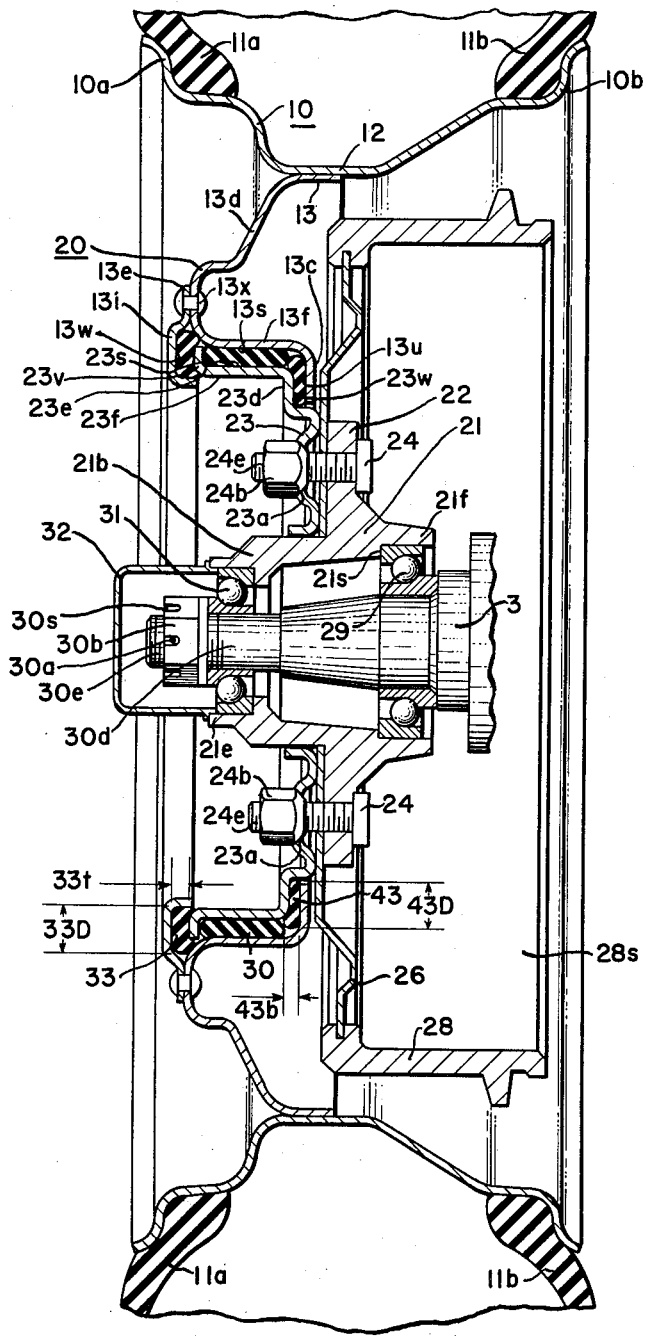
Fig. 1 is a cross sectional elevational view of a wheel cushioning structure in accordance with the present invention.

The wheel as shown in Fig. 1 comprises an outer rim 10 having flange portions 10a and 10b against which tire beads 11a and 11b are pressed in sealing engagement. The outside rim or tire mounting annular member 10 is provided with an inner portion 12 intermediate the flanges 10a and 10b and is adapted to be supported by a lateral flange or cylindrical portion 13 of an outer rim or disc member 13d. The disc 13d is one part of a subassembly generally indicated by numeral 20 which is provided between the tire mounting rim and a wheel hub 21 provided with a radially outwardly extending flange 22. The subassembly 20 also includes an inner annular disc portion or member 23d having a radially inwardly extending flange portion 23 which is provided with apertures 23a located about a peripheral surface of the radial flange 23. The hub flange 22 carries a plurality of studs 24 having threaded ends 24e which project through the apertures 23a and onto which nuts or bolts 24b are threaded to fasten the wheel in a usual manner to the hub 21.

Secured between the disc 23 and hub flange 22 there is a flange portion or radially inwardly extending member 26 of a brake drum 28 having a braking surface 28s extending longitudinally and axially of the hub 21. The hub 21 is provided with a flange portion 21f having a shoulder 21s along an inner peripheral surface thereof adapted to be engaged by a bearing 29 with an outer race in engagement with the flange 21f of the hub and an inner race in engagement with a cylindrical portion of an axle 3. The axle has a reduced diameter portion 30d with a threaded end 30e onto which a nut or bolt 30b is threaded for retaining a bearing 31 between the reduced diameter portion 30d and an outwardly extending annular flange or shoulder 21b of the hub 21. The nut 30b is provided with a plurality of radially outwardly extending slots 30s so that a cotter pin can be inserted through an aperture 30a of the axle when one pair of slots 30s are aligned relative to the aperture 30a for insertion and crimping over of the end of such a cotter pin generally used to lock the nut 30b against rotation relative to the end of the axle 3. A protective cap, hub, or grease cup 32 is press fitted inside a radial inner surface of an end 21e of the hub 21.

The subassembly 20 of the present invention further includes flange portions 13f and 23f provided extending longitudinally and concentrically relative to each other but spaced a predetermined distance from each other radially between flange 13f and flange 23f of the annular disc members 13d and 23d, respectively. The flange 13f has a surface 13s along a radial inner periphery thereof which is substantially equal to a surface area 23s along the radially outer periphery of flange 23f. The surfaces 13s and 23s are radially aligned and positioned concentrically and axially relative to the hub portion 21b and reduced diameter axle portion 30d as illustrated in the wheel assembly of Fig. 1.

The outer annular disc or web 13d has a radially inner flange 13c which is parallel to and spaced from disc 23d. The disc or outer rim 13d also carries an intermediate flange portion 13i having a radial outer annular end or flange 13e provided with apertures through which a rivet 13x is inserted and secured by flattening of opposite end heads of the rivet in a usual manner. It is to be understood that the radial outer end flange 13e can also be welded or otherwise suitably secured to the outer rim or web 13d. The intermediate flange portion 13i is provided with an inner radial surface or wall portion 13w which is complementary to a radially outwardly extending end 23e of inner rim or web 23d having a wall 23v facing the wall 13w but spaced therefrom. Similarly, the radially inwardly extending flange 13c of the outer rim or web has an inner surface or wall portion 13u which faces an outwardly extending surface or wall portion 23w provided on the inner disc 23. The surface 13u extends radially outwardly and is spaced axially and longitudinally relative to the surface portion or wall 23w as is obvious from the drawings.

In accordance with the present invention, a plurality of annular elastomeric bushings are inserted easily and in a short period of time in a preloaded condition between complementary surfaces of the outside rim, disc or web 13d and the inside rim, disc or web 23d. One of these bushings or rings is generally indicated by numeral 30 and, as is visible in Fig. 2, this ring 30 is shaped originally having a substantially square or rectangular cross section which is pressed between flanges 13f and 23f and into engagement with surfaces 13s and 23s, respectively, for supporting the outside rim 13d radially outwardly from the inside rim or web 23d. Since the areas of surfaces 13s and 23s in engagement with the elastomeric bushing or ring 30 are substantially equal to each other, the inner and outer rims are retained in an assembled relationship relative to each other by a resilient preloading provided by the elastomeric bushing 30 such that there is no tendency for the inner and outer rim members to separate and explode out of assembled relationship. The ring 30 can be bonded or cemented to the surfaces 13s and 23s or can be only pressed into tight resilient engagement therewith so that the preloaded forces tend to retain the bushing 30 and inner and outer rim members in assembled relationship.

The bushing 30 is compressed between the surfaces 13s and 23s from an initial inner diameter $D_a$ of the ring 30 to a larger inner diameter $D_b$ of the surface 23s. Also the outer diameter $D_c$ of the elastomeric ring 30 is reduced to a smaller inner diameter $D_d$ of the flange portion 13f along radially inner surface 13s. The structure obtained by compressing the elastomeric ring 30 radially between the surfaces 13s and 23s provides a torsional cushion at the wheel for shock loading induced by acceleration or deceleration of a vehicle and reduces torsional vibration noises excited by brake applications, final or rear axle drive transmitting forces to the wheel, and other noise sources such as tire noises and road surface irregularities otherwise transmitted from the rim through the axle to the vehicle. Due to the preload rubber mounting provided by use of elastomeric bushing 30 between substantially equal surface areas 13s and 23s, there is both a torsional and a lateral or axial deflecting force available for maintaining a substantially constantly variable damping of any shocks including shearing or axial forces to which the wheel may be subjected relative to the hub and axle. Axial play of the wheel rim outer portion relative to the wheel rim inner portion is controlled but not eliminated by use of the elastomeric bushing supporting the outer rim portion on the inner rim portion.

Figure 2:
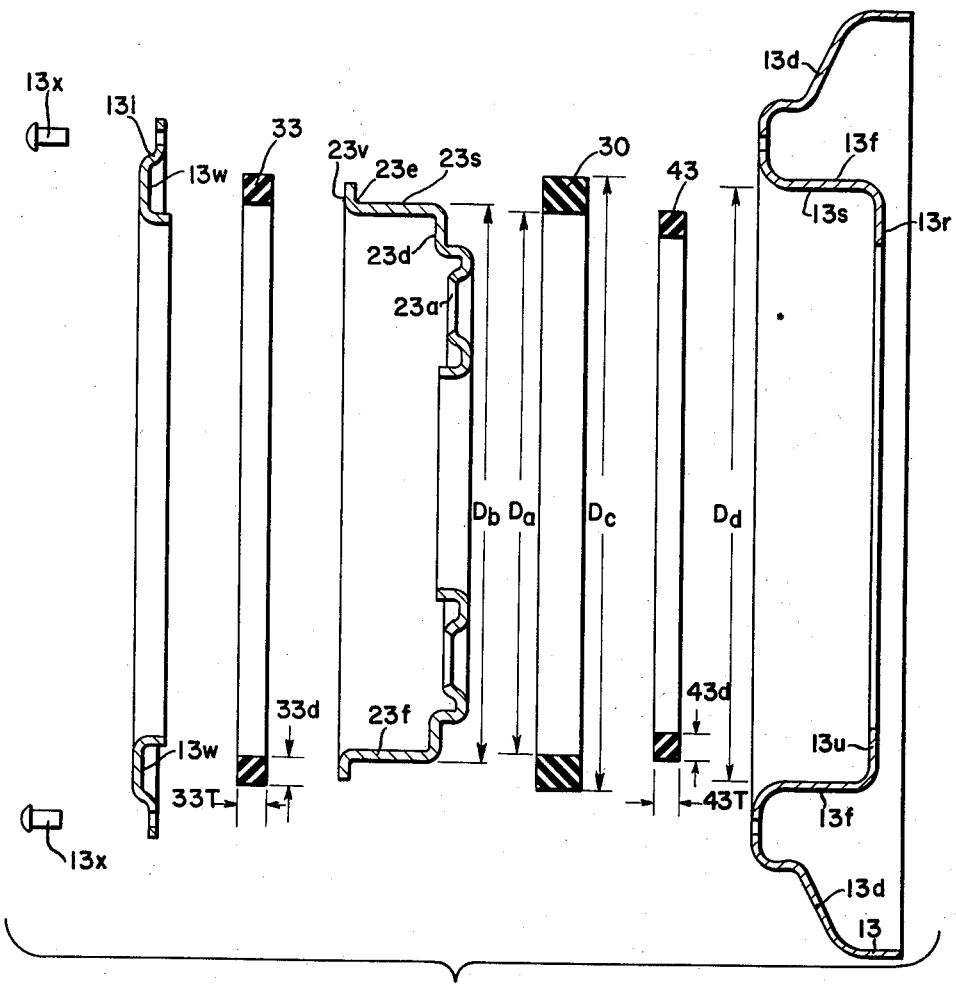
Fig. 2 is an exploded cross sectional elevational view of a wheel disc cushion subassembly for use in the wheel structure of Fig. 1.

The subassembly illustrated in the exploded view of Fig. 2 further includes a pair of elastomeric bushings 33 and 43 each originally having a substantially square or rectangular cross section while in a natural or uncompressed condition. These bushings 33 and 43 are compressed laterally and spread radially whereas the elastomeric bushing 30 is compressed radially and spread laterally and longitudinally of the axis of the hub 21. Bushing or control pad 33 has an uncompressed thickness 33T which is reduced to a thickness 33t when the bushing 33 is pressed between surfaces of wall portions 13w and 23v. The bushing 43 has an initial thickness 43T which is reduced to a thickness 43b when the bushing 43 is pressed between the wall surface portions 13u and 23w. The pad or elastomeric ring 33 opposes axial shifting of the flange end 23e of the inner rim 23d relative to the intermediate flange portion 13i of the outer rim or member 13d. The elastomeric bushing 43 opposes lateral or axial shifting of the inner disc 23d relative to the surface wall portion 13u of radial flange 13r of the outer rim member 13d and vice versa. The preloaded effect of the bushings 30, 33, and 43 serves to cushion flange portions of the inner and outer disc or web members relative to each other such that torsional and axial movements or forces are counteracted by inherent resilience of the bushings due to the compression thereof between various surface areas of the flange portions as described above. It is obvious that the bushings 33 and 43 are spread radially inwardly and outwardly from an initial dimension 33d to a larger dimension 33D and similarly, 43d and 43D shown in Figures 2 and 1, respectively. While the surfaces 23v and 13w as well as surfaces 23w and 13u are not necessarily equal to each other, a locking engagement of the flange end 23e and flange portion 13c occurs relative to intermediate flange portion 13i and inner rim 23d, respectively, tending to control and contain the preloaded bushings 33, 43, and 30 in concentric and preloaded condition relative to each other and the surfaces they engage as illustrated in the view of Fig. 1. Lateral control axially with the wheel is accomplished by the bushings preloaded at assembly. This provides a high lateral rate axially with the elastomeric material in compression. Because of the preload at assembly, the rings 33, 43 also carry torsional loads in shear thus helping to reduce torsional stresses on the bushing 30.

Among the advantages of the construction for the wheel cushioning structure of the present invention is the reduction of torsional vibration noises excited by brake application, tire noises and road surface irregularities. Using rings 33, 43 and bushing 30 eliminates metal to metal contacts between disc portions avoiding a lubrication problem and reducing undesirable noise encountered with sliding engagement of any disc portion relative to other wheel parts. The plurality of preloaded bushings can be preassembled easily into subassembly 20 for use to absorb torsional vibrations and since the rubber or elastomeric material is compressed under torsional forces as well as radial and even axial loads in the plane of the wheel, lateral movements parallel to the axis of hub or axle are also counteracted by the resilient preloaded bushings. A cushioned yet very strong preloaded joint is provided between the inner and outer rim portions due to the axial and torsional preloading of plurality of rubber or elastomeric material bushings. The parts illustrated in the exploded view of Fig. 2 are easy to assemble and retain in assembled relationship due to the telescoping character of the inner and outer rim portions relative to the plurality of bushings 30, 33, and 43 locked together by fastening the intermediate flange portion or disc 13i securely against the outer rim member 13d by use of rivets 13x or other suitable fastening means such as welding around the periphery of the disc. Also to be noted is that when preloaded rubber is used for bushings 30, 33, and 43, the resilience or "life" of the rubber is prolonged because rubber is maintained resilient as a cushion longer when prestressed or compressed by mounting means such as the subassembly 20 for the wheel cushioning structure of the present invention. When rubber is left in a natural or un-preloaded condition the resilience and "life" thereof is rapidly lost due to aging and hardening of the un-stressed rubber material. In the bushings 30, 33, and 43, the preloading provided by the structure of the present invention assures continuous cushioning of axial and torsional forces encountered between the hub and tire rim.

While the embodiments of the present invention as herein disclosed constitutes a preferred form, it is to be understood that other forms might be adopted.

What is claimed is as follows:

1. A road wheel construction for use in supporting a vehicle tire mounting rim relative to a hub, comprising, inner and outer disc portions having flanges remote from said rim as well as said hub and providing inner and outer annular surfaces of substantially equal area relative to each other, said inner and outer surfaces being concentric relative to each other, flange portions extending radially of the hub and carried by said inner and outer discs, said radial flange portions being spaced longitudinally from each other and a plurality of preloaded elastomeric bushings provided between said inner and outer disc portions and including a pair of rings compressed between said radial flange portions at each of opposite ends of the inner and outer concentric surfaces as well as an annular bushing compressed between said inner and outer concentric surfaces of substantially equal areas, said latter bushing providing preloading force for cushioning axial as well as torsional deflections of said inner and outer disc portions relative to each other.

2. The road wheel construction of claim 1 in which said plurality of preloaded elastomeric bushings are each deformed to a stressed substantially rectangular shape from a natural substantially square shape and thereby provide cushioning of both axial and torsional forces encountered by said inner and outer disc portions used for supporting the tire mounting rim relative to the hub.

3. In a road wheel construction for use in supporting a vehicle tire mounting rim relative to a hub, a wheel disc subassembly for cushioning axial and torsional shock forces between the rim and hub, comprising, inner and outer annular portions having axially extending flange portions radially spaced from each other and remote from said rim and hub, a preloaded elastomeric bushing provided between said flange portions and resiliently supporting said inner and outer annular portions relative to each other and used for opposing torsional and axial deflections of the rim relative to the hub and vice versa, radial flanges carried by each of said annular portions and spaced longitudinally relative to each other, and preloaded elastomeric ring means provided at each end of said preloaded bushing and compressed between said radial flanges for aiding in controlling axial and torsional deflection as opposed by said preloaded bushing.

4. The subassembly of claim 3 in which said preloaded bushing and ring means are compressed from a naturally greater thickness to a smaller thickness between said radially spaced flange portions and radial flanges and thereby are stressed to prolong resilience of the cushioning provided by said preloaded ring means as well as said preloaded bushing, said preloaded bushing and ring means providing the only support radially and axially between said inner and outer annular portions.

References Cited in the file of this patent

UNITED STATES PATENTS

| | | |
|---|---|---|
| 1,444,048 | Walther | Feb. 6, 1923 |
| 2,004,922 | Bourdon | June 18, 1935 |
| 2,609,856 | Patch | Sept. 9, 1952 |

FOREIGN PATENTS

| | | |
|---|---|---|
| 37,010 | Netherlands | Dec. 16, 1935 |